(12) United States Patent
Egeberg

(10) Patent No.: US 8,418,605 B2
(45) Date of Patent: Apr. 16, 2013

(54) APPARATUS AND METHOD FOR COMPACTION OF SILICON POWDER

(75) Inventor: Per Kristian Egeberg, Kristiansand (NO)

(73) Assignee: SilanSil AS, Grimstad (NO)

(*) Notice: Subject to any disclaimer, the term of this patent is extended or adjusted under 35 U.S.C. 154(b) by 468 days.

(21) Appl. No.: 12/673,783

(22) PCT Filed: Aug. 7, 2008

(86) PCT No.: PCT/NO2008/000288
§ 371 (c)(1),
(2), (4) Date: Feb. 17, 2010

(87) PCT Pub. No.: WO2009/025559
PCT Pub. Date: Feb. 26, 2009

(65) Prior Publication Data
US 2011/0018159 A1 Jan. 27, 2011

(30) Foreign Application Priority Data
Aug. 17, 2007 (NO) .................................. 20074225

(51) Int. Cl.
B30B 13/00 (2006.01)
(52) U.S. Cl.
USPC ........................................... 100/35; 264/109

(58) Field of Classification Search .................... 100/35, 100/37, 92, 104, 110, 111; 419/1, 48, 55; 264/109; 425/405.1
See application file for complete search history.

(56) References Cited

U.S. PATENT DOCUMENTS

| | | | |
|---|---|---|---|
| 2,676,882 A * | 4/1954 | Hatch | 419/48 |
| 5,391,354 A * | 2/1995 | Petersen et al. | 422/129 |
| 6,254,940 B1 * | 7/2001 | Pratsinis et al. | 427/562 |
| 6,444,009 B1 * | 9/2002 | Liu et al. | 75/332 |

FOREIGN PATENT DOCUMENTS

| | | |
|---|---|---|
| DE | 19752653 A1 | 6/1999 |
| FR | 2243892 A1 | 4/1975 |
| FR | 2591412 A1 | 6/1987 |
| WO | 2005054130 A1 | 6/2005 |
| WO | 2005118474 A1 | 12/2005 |

* cited by examiner

Primary Examiner — Jimmy T Nguyen
(74) Attorney, Agent, or Firm — Volpe and Koenig, P.C.

(57) ABSTRACT

An apparatus is provided for compaction of silicon powder in a reactor to minimize oxidation of the silicon, which compaction is in part effected by using the drop in pressure across a filter for exit gases from the reactor, the silicon powder being passed along a duct towards an exit of a reactor. The compaction is in addition carried out mechanically with the aid of a piston arranged at a gas exit, the filter advantageously being arranged on the piston, the filter being permeable to the gases, but collecting the powder. A method is also provided for compaction of silicon powder using an apparatus as described above.

4 Claims, 2 Drawing Sheets

APPARATUS AND METHOD FOR COMPACTION OF SILICON POWDER

CROSS REFERENCE TO RELATED APPLICATION

This application is a National Stage Entry of PCT/NO08/00288, filed Aug. 7, 2008.

FIELD OF INVENTION

The present invention relates to an apparatus and a method for compaction of silicon powder. More specifically, the invention relates to an apparatus for compaction of silicon powder in a free space reactor to minimise oxidation of the silicon and a method for compaction of silicon powder in a free space reactor for minimising oxidation of the silicon.

BACKGROUND

Thermal decomposition of silane (SiH4) is an established method for the production of solar cell grade silicon. The decomposition takes place on already existing silicon surfaces, either oil Si rods in a Siemens reactor or on Si particles in a fluidised bed reactor.

As examples of prior art in the field, mention may be made of FR A 2591412, WO A12005/054130 and WO A12005/118474.

Decomposition in a gas phase in a free space reactor is challenging because large parts of the product consist of extremely small Si particles (dust), having a, density of about 50 g/L. This dust has a very large surface/volume ratio, and is subject to oxidation and contamination. The oxide layer makes it difficult to melt the powder.

There is therefore a need for an apparatus and a method with which to compact the powder that do not contaminate the powder or expose it to oxygen.

The aforementioned problem is sought to be solved by an apparatus and a method as respectively disclosed herein.

BRIEF DESCRIPTION OF THE DRAWINGS

The invention is described in more detail below, with reference to the attached drawings and the appended claims, wherein

DETAILED DESCRIPTION OF THE PREFERRED EMBODIMENTS

The main idea behind the invention is that to avoid contamination of the silicon powder and contact with oxygen, the compaction of the powder is advantageously carried out inside the reactor in which the powder is produced. The compaction of the powder is effected in part by using the drop in pressure across a filter for the exit gases from the reactor, supplemented by mechanical compaction with the aid of one or more pistons arranged at the exit of the aforementioned filter.

Figure 1:
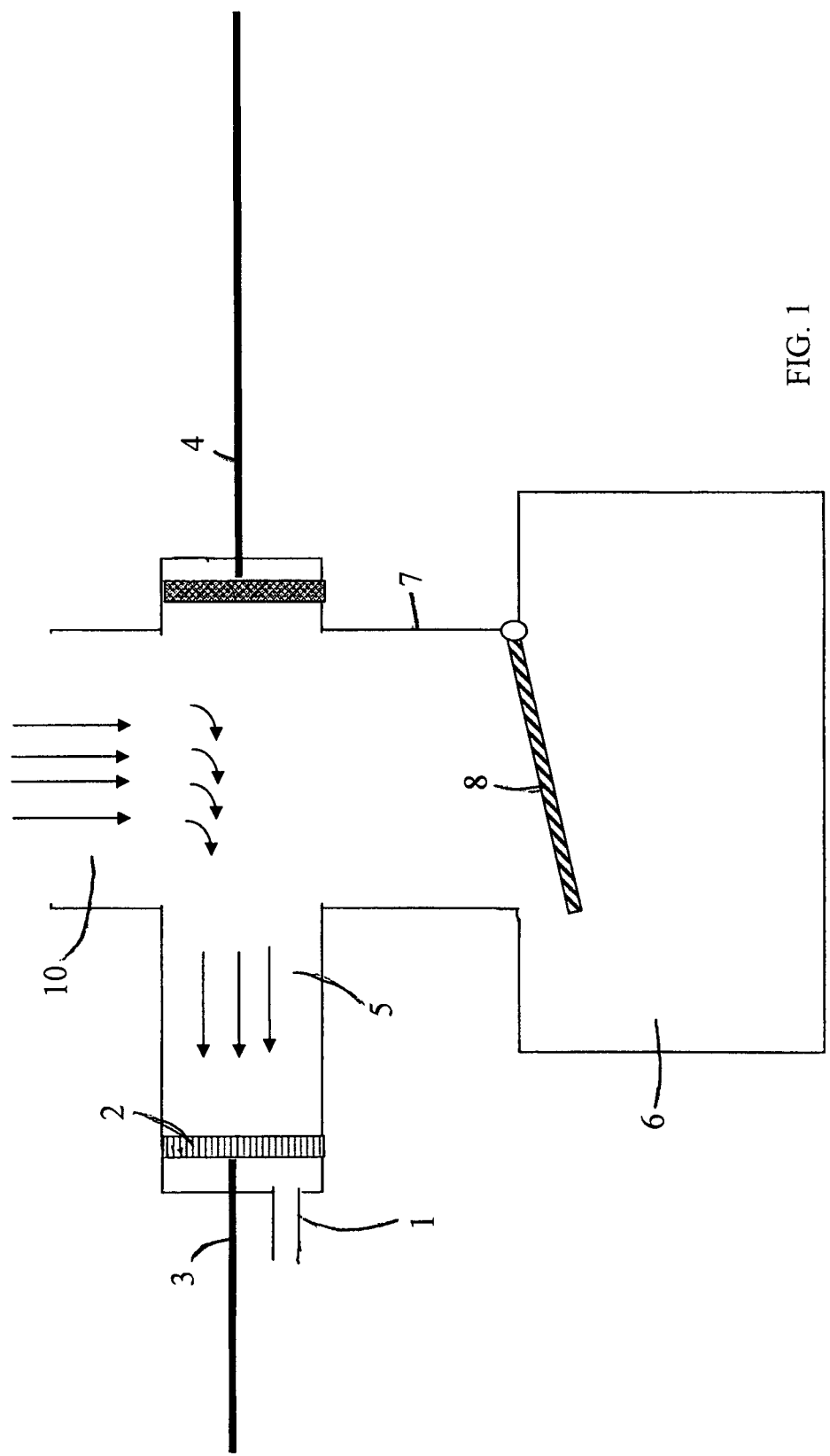
FIG. 1 is a schematic diagram of a first embodiment of an apparatus according to the invention.

With reference to FIG. 1, a first embodiment of the invention is shown. The silicon powder is passed along a duct 10 towards an exit 1 of a reactor with the gas flow, as is indicated by arrows. The powder is collected on a filter 2 arranged on a piston 3, the filter 2 collecting the particles, but being permeable to the gas.

After a given amount of particle dust has been collected on the filter 2 arranged on the piston 3, an oppositely axially arranged piston 4 is pushed towards the piston 3 to compact the powder between the piston 3 and the piston 4, said pistons 3 and 4 being arranged in a common straight duct 5 arranged at an angle relative to the duct 10.

The compacted powder is subsequently transported to a crucible or replaceable container 6 by pushing the piston 3 in along the duct 5 whilst the piston 4 is pulled back in the duct 5 and into its starting position. The container 6 is connected to the ducts 5, 10 via a vertical duct 7 which is advantageously arranged at an angle relative to the duct 5 and out of the particle-carrying gas flow to the exit 1, and the compacted powder thus falls into the container 6 via the duct 7 under the effect of gravity. The replaceable container 6 is advantageously equipped with a valve 8 and a non-illustrated gas lock so that the container 6 can be replaced without altering the atmosphere in the reactor or in the container 6.

Figure 2:
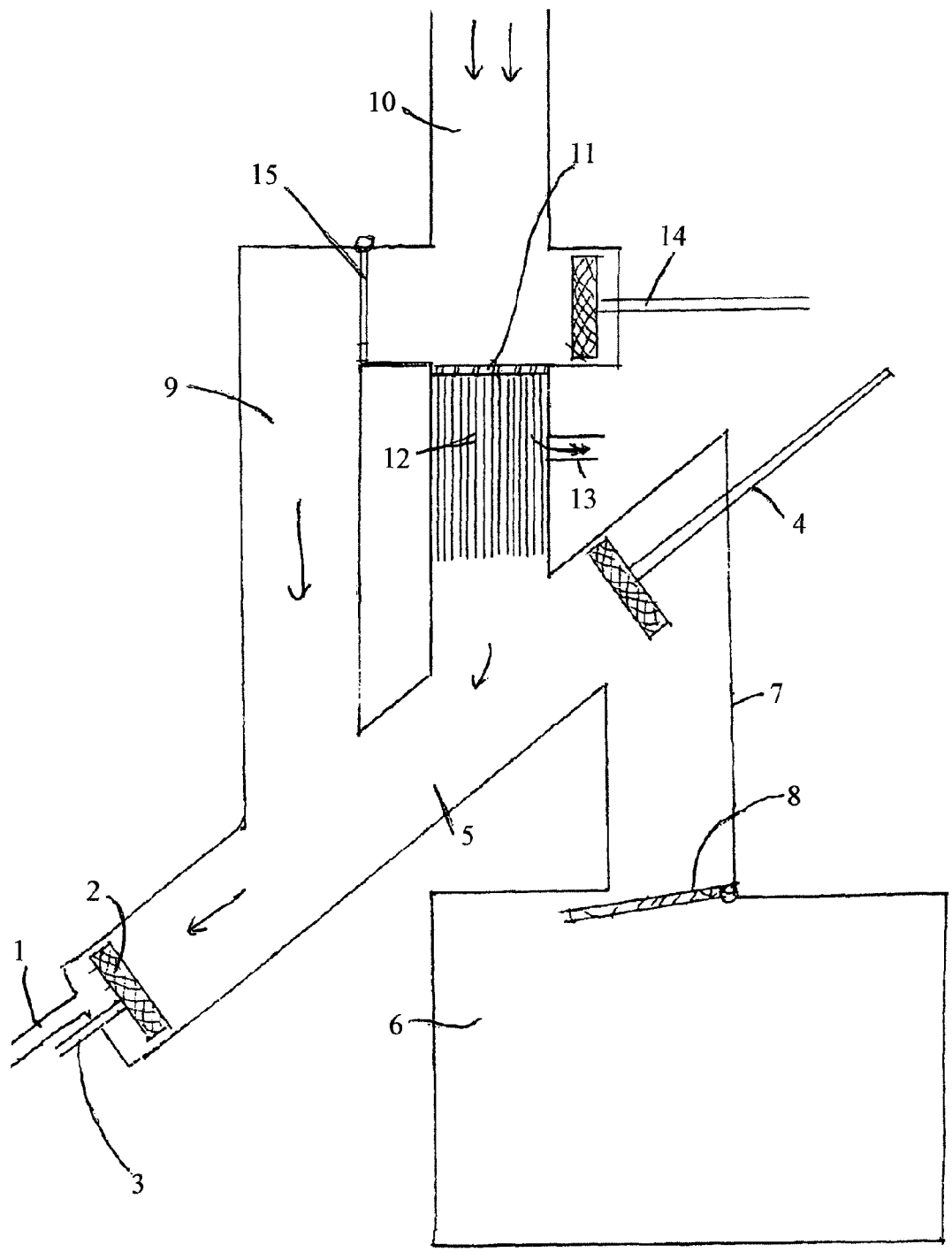
FIG. 2 is a schematic diagram of a second, alternative embodiment of the invention.

A second embodiment shown in FIG. 2 is a further development of the first embodiment shown in FIG. 1, and, as can be seen from the figures, like or similar parts or components have like reference numerals.

The embodiment in FIG. 2 is provided to prevent a blockage or excessive reduction of the permeability of the filter 2 owing to accumulated powder, and differs from the embodiment shown in FIG. 1 largely in that a bypass 9 is provided for separating off large particles or particle agglomerates, there being provided in the duct 10 a screen 11 which, in the direction of flow, is followed by a hollow fibre filter 12. The bypass 9 is arranged at an angle, advantageously about 90°, relative to the duct 10 and with the screen 11 essentially flush with the inner wall of the duct 10, a piston 14 being arranged in a blind end of the duct 9 for scraping large particles or agglomerates off the surface of the screen 11, through a gas-tight valve 15 oppositely arranged in the inlet of the bypass 9, after which said large particles or particle agglomerates continue down along the bypass 9, out into the duct 5 and to the filter 2 arranged on the piston 3. The small particles are passed to the same filter 2 through the screen 11, through the hollow fibre filter 12 and otherwise essentially as in the first embodiment as described above. The piston 3 to which the filter 2 is attached then moves the small and large particles together up through the duct 5, through the duct 7 and to the container 6. In the embodiment shown in FIG. 2, two separate gas exits are provided: one in the form of the exit 1 in connection with the filter 2 and another one in the form of an exit 13 in connection with the hollow fibre filter 12.

In the aforementioned embodiment, the purpose of the screen 11 is to protect the hollow fibre filter 12, whilst the purpose of the gas-tight valve 15 is to shut off the bypass 9 when the piston 14 is not in operation, as will be apparent to those of skill in the art in the light of the description.

A further, non-illustrated, conceivable embodiment can be said to be something in between the two embodiments described above, wherein in the duct 10 of the first embodiment there is only added a hollow fibre filter 12 without any bypass 9. Preliminary tests show, however, that in addition to the powder, agglomerates of powder are formed, such that an embodiment of this kind in practice may be less suitable.

The present invention should only be regarded as limited by the claims, as those of skill in the art will see, in the light of the description, that many modifications are possible within the scope of the invention. For example, the piston 4 could be omitted and the compaction of the silicon powder deposited on the filter 2 could be effected by moving the piston 3 on which the filter 2 is arranged against a wall of the duct 7.

The invention claimed is:

1. A method for compaction of silicon powder in a free space reactor for minimising oxidation of the silicon, comprising the steps of:
    passing the silicon powder along a duct towards a gas exit (1) of a reactor;
    depositing the silicon powder on a filter for exit gases from the reactor, further comprising the step of:
    compacting the silicon powder mechanically with the aid of at least one piston arranged at the gas exit.

2. A method according to claim 1, further comprising the step of pushing a piston arranged axially opposite to the piston towards the piston, the pistons being arranged in a common straight duct arranged at an angle relative to the duct.

3. A method according to claim 1 further comprising the steps of separating off large particles or particle agglomerates from a main gas flow from the duct through a bypass and returning said large particles or particle agglomerates to another duct and the filter, the main gas flow carrying with it small particles through a filter to the filter.

4. A method according to claim 3, further comprising the step of pushing the large particles or particle agglomerates deposited in front of the filter in through a gas-tight valve to the bypass with the aid of a piston.

* * * * *